US009462362B2

United States Patent
Yamanaka et al.

(10) Patent No.: US 9,462,362 B2
(45) Date of Patent: Oct. 4, 2016

(54) MICROPHONE SUPPORT DEVICE FOR SOUND SOURCE LOCALIZATION

(71) Applicant: NISSAN MOTOR CO., LTD., Yokohama-shi, Kanagawa (JP)

(72) Inventors: Takaaki Yamanaka, Hachioji (JP); Masaya Gotou, Isehara (JP); Toshihiko Kato, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/775,062

(22) PCT Filed: Jan. 31, 2014

(86) PCT No.: PCT/JP2014/052237
§ 371 (c)(1),
(2) Date: Sep. 11, 2015

(87) PCT Pub. No.: WO2014/156292
PCT Pub. Date: Oct. 2, 2014

(65) Prior Publication Data
US 2016/0037244 A1    Feb. 4, 2016

(30) Foreign Application Priority Data
Mar. 29, 2013 (JP) .................. 2013-071479

(51) Int. Cl.
| H04R 25/00 | (2006.01) |
| H04R 1/02 | (2006.01) |
| H04R 1/08 | (2006.01) |
| H04R 1/40 | (2006.01) |
| G01S 3/80 | (2006.01) |
| G01S 3/805 | (2006.01) |

(52) U.S. Cl.
CPC . *H04R 1/02* (2013.01); *G01S 3/80* (2013.01); *G01S 3/805* (2013.01); *H04R 1/08* (2013.01); *H04R 1/406* (2013.01); *H04R 2201/401* (2013.01); *H04R 2201/405* (2013.01)

(58) Field of Classification Search
CPC .......... H04R 1/02; H04R 1/08; H04R 1/406; H04R 2201/401; H04R 2201/405
USPC .................. 381/361, 362, 363, 366
See application file for complete search history.

(56) References Cited

U.S. PATENT DOCUMENTS

| 5,648,936 A * | 7/1997 | Clark ............... H04R 1/406 367/13 |
| 9,084,057 B2 * | 7/2015 | Turqueti ............ H04R 1/326 |
| 2005/0225497 A1 | 10/2005 | Christensen et al. |
| 2008/0260167 A1 | 10/2008 | Kim et al. |

FOREIGN PATENT DOCUMENTS

| JP | 2005521283 A | 7/2005 |
| JP | 2008048294 A | 2/2008 |
| JP | 2008268176 A | 11/2008 |
| JP | 2011015050 A | 1/2011 |
| JP | 2011049974 A | 3/2011 |
| JP | 2011149782 A | 8/2011 |

* cited by examiner

Primary Examiner — Brian Ensey
(74) Attorney, Agent, or Firm — Young Basile Hanlon & MacFarlane, P.C.

(57) ABSTRACT

A microphone support device includes a ring-shaped flame, a plurality of fixed arms which protrude toward an inner side of the flame, a plurality of movable arms which are longer than the fixed arms and are detachable, and multiple microphones. A small-size microphone array is constructed by accommodating the plurality of movable arms inside of the flame in a radiating state. On the other hand, a large-size microphone array is constructed by radially developing the plurality of movable arms outside of the flame. When constructing a circular two-dimensional microphone array, a size of the circular two-dimensional microphone array can be easily changed in this manner. Hence, the sound localization can be handled over a wide frequency range.

6 Claims, 8 Drawing Sheets

MICROPHONE SUPPORT DEVICE FOR SOUND SOURCE LOCALIZATION

CROSS REFERENCE TO RELATED APPLICATION

The present application claims priority to Japanese Patent Application No. 2013-071479, filed Mar. 29, 2013, incorporated herein in its entirety.

TECHNICAL FIELD

The present invention relates to a microphone support device for sound source localization which is configured to construct a two-dimensional microphone array in a sound-source localization system.

BACKGROUND

In a technique of the sound-source localization system using a beam-forming theory, a microphone array is constructed by using a plurality of microphones, and thereby a sound only in a target direction is extracted by realizing a sharp directivity by way of operations and synthesis from amplitudes and phases inputted into the respective microphones. For example, Japanese Patent Application (translation of PCT international application) Publication No. 2005-521283 or Japanese Patent Application Publication No. 2011-15050 proposes a microphone array which is used for such a sound-source localization system.

In the microphone array disclosed in Japanese Patent Application (translation of PCT international application) Publication No. 2005-521283 or Japanese Patent Application Publication No. 2011-15050, a plurality microphones are arranged on a plurality of radial lines with predetermined pitches, and as a result, the microphones are respectively located on a plurality of concentric circles. However, the microphone array is designed not to orient each of the plurality of radial lines to a center of the concentric circles. Thus, a circular microphone array having a pseudorandom microphone distribution which is considered to be favorable in the field of acoustic beam-forming technique can be obtained.

If a phase difference cannot be sufficiently secured when the sound-source localization system controls phases, the directivity of beam for sound source localization is reduced so that an accuracy of the sound source localization is lowered. This occurs in the case that a size of the array or a distance between microphones is small relative to a wavelength corresponding to target frequency of the sound source localization. On the other hand, if trying to sufficiently secure the phase difference by widening the distance between microphones, there is a risk that the phase is shifted by more than 360 degrees to cause an excessively large phase difference in a high-frequency region, so that a side-lobe level is increased.

In other words, if the microphone array as typified by Japanese Patent Application (translation of PCT international application) Publication No. 2005-521283 and Japanese Patent Application Publication No. 2011-15050 is applied to a sound localization system for an electric powertrain unit of an automotive vehicle or the like, the vehicle generates noises in a wide frequency range approximately from several hertz (Hz) to several kilohertz (kHz), and hence, the microphone array having such one size cannot deal with a sound localization for these noises having the wide frequency range.

SUMMARY

The present invention focuses on the above-mentioned problem. There is provided a microphone support device for sound source localization, devised to be capable of dealing with the sound localization in the wide frequency range by enabling a size of circular two-dimensional microphone array to be easily changed when constructing the circular two-dimensional microphone array.

According to the present invention, a microphone support device which forms a two-dimensional microphone array includes a ring-shaped frame; a plurality of fixed arms formed to protrude from the frame toward an inner side of the frame and not to be oriented to a center of the frame; a plurality of movable arms configured to be selectively switched between an accommodated position in which the plurality of movable arms radially protrude from the frame toward the inner side of the frame so as not to be oriented to the center of the frame and not to interfere with the fixed arms and a developed position in which the plurality of movable arms radially protrude from the frame toward an outer side of the frame so as not to orient extended axes of the plurality of movable arms to the center of the frame; stationary-side microphone attachment portions formed at tip portions of the fixed arms and intersection portions between the frame and the fixed arms; and movable-side microphone attachment portions formed at tip portions of the movable arms.

According to the present invention, each of the movable arms is selectively switched between the accommodated position and the developed position. Hence, both of so-called small-size microphone array and large-size microphone array can be realized because the size of the circular microphone array which has a pseudorandom microphone distribution is changed. Therefore, one microphone support device can deal with the sound source localization over a wide frequency range.

DESCRIPTION OF THE DRAWINGS

FIGS. 4A and 4B are views showing details of movable arms which are applied to the frame shown in FIG. 3.

FIGS. 5A and 5B are views showing details of microphone holders which are applied to the frame shown in FIG. 3.

FIGS. 7A and 7B are views showing details of a stand shown in FIGS. 1 and 2.

DETAILED DESCRIPTION OF THE EMBODIMENTS

Figure 1:
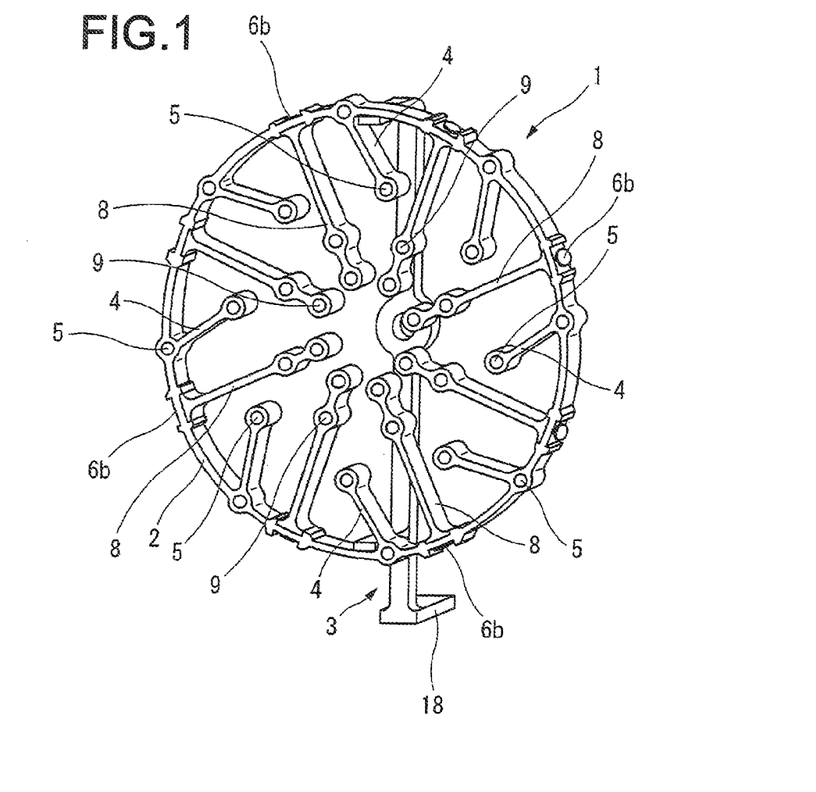
FIG. 1 is an oblique perspective view which illustrates a preferred embodiment of a microphone support device according to the present invention and which shows an accommodated state of the microphone support device given in order to form a small-size microphone array.
Figure 2:
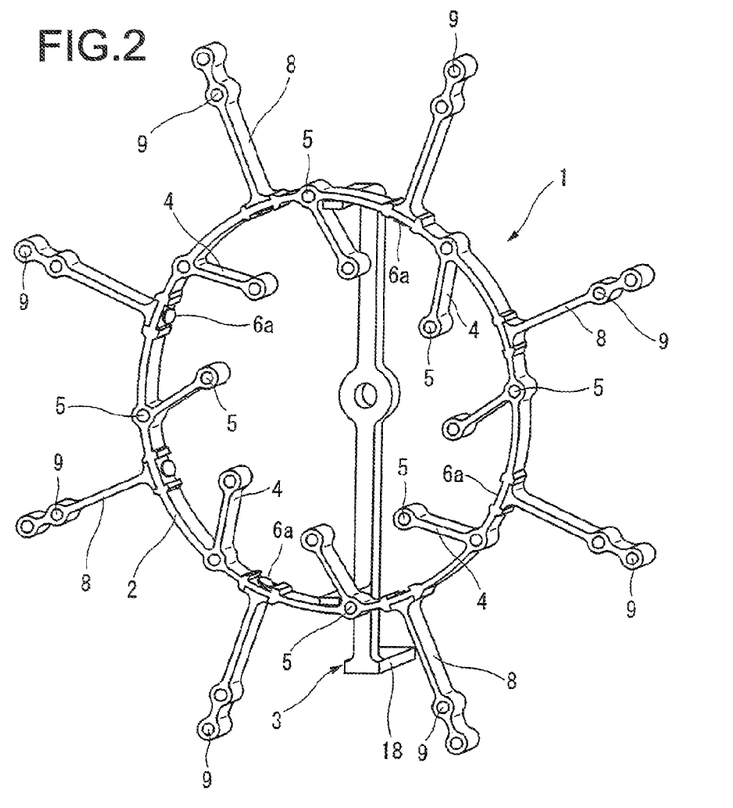
FIG. 2 is an oblique perspective view showing a developed state of the microphone support device given in order to form a large-size microphone array.

FIGS. 1 and 2 are views showing a concrete embodiment of a microphone support device for sound source localization according to the present invention. FIG. 1 illustrates a state where the microphone support device was accommodated (non-developed) to construct a microphone array having a small size (small diameter) as a two-dimensional circular microphone array. In the same manner, FIG. 2 illustrates a state where the microphone support device was developed to construct a microphone array having a large size (large diameter) as a two-dimensional circular microphone array.

The microphone support device 1 shown in FIGS. 1 and 2 includes a circular ring-shaped frame 2 as a main element. The frame 2 is supported by a stand 3 and can be detached from the stand 3. A base portion 18 of the stand 3 is fixedly supported by a tripod or the like (not shown).

Figure 3:
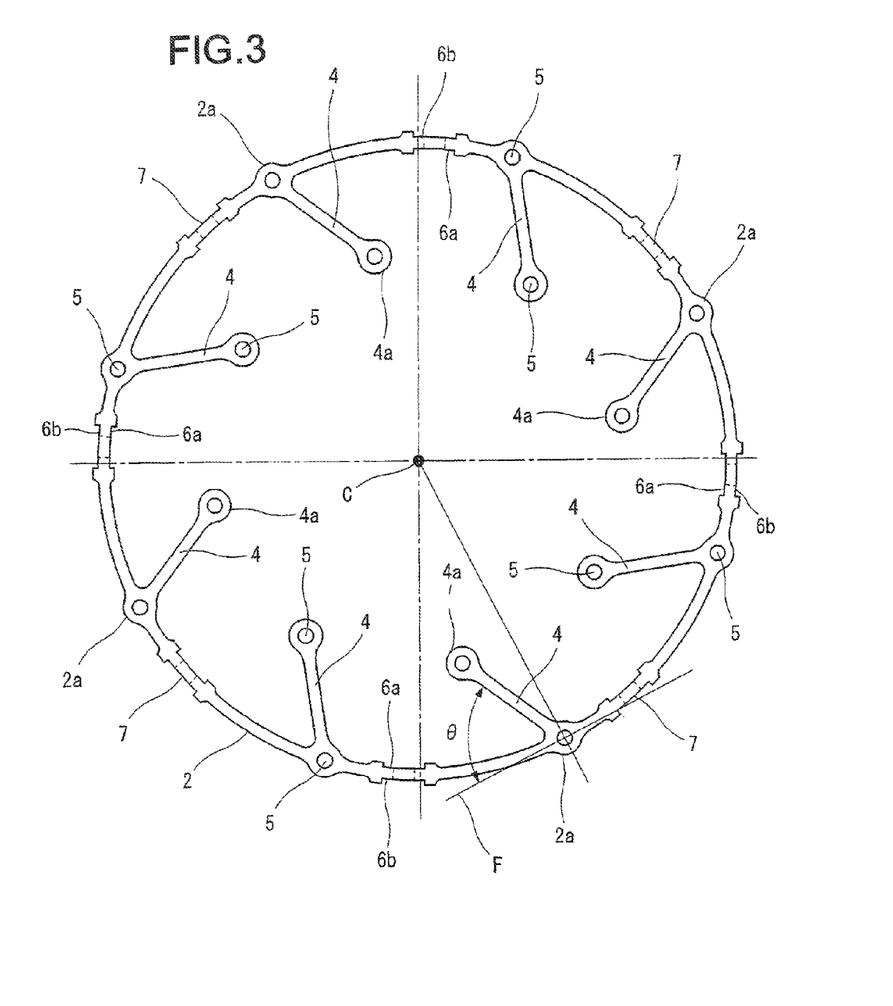
FIG. 3 is an explanatory front view showing details of a ring-shaped frame including fixed arms shown in FIGS. 1 and 2.

The frame 2 is made of aluminum alloy and has a predetermined width dimension. As shown in FIG. 3, eight fixed arms 4 are formed integrally with the frame 2 at circumferentially even intervals as given by circumferentially-divided eight equal parts of the frame 2. The respective fixed arms 4 protrude toward a radially inner side of the frame 2. A tip portion of each of the fixed arms 4 is locally thickened and thereby forms a cylindrical socket 4a. Moreover, although each fixed arm 4 extends in a radial fashion, an axis of the fixed arm 4 is not oriented toward (does not pass through) a center C of the frame 2. In other words, the axis of each fixed arm 4 is arranged to be inclined in an identical direction from a tangent line F of the frame 2 to form an acute angle θ in clockwise direction between the axis of the fixed arm 4 and the tangent line F, so that the axis of the fixed arm 4 does not intersect with the center C of the frame 2. It is noted that the tangent line F passes through a center of an attaching hole 5 of a root portion of the fixed arm 4 as mentioned below. The respective fixed arms 4 may take an identical value as the acute angle θ, or may take different values from each other as the acute angle θ.

Also an intersection portion (the root portion of the fixed arm 4) between each fixed arm 4 and the frame 2 is locally thickened to form a socket portion 2a in the same manner as the tip portion of the fixed arm 4. Each of these socket portions 2a is formed with the circular attaching hole 5 as a stationary-side microphone attachment portion. The stationary-side microphone attachment portions are constituted by the socket portions 2a and the socket portions 4a of the fixed arms 4.

Moreover, the frame 2 is formed with eight inside attaching seats 6a and eight outside attaching seats 6b each located at circumferentially even intervals as given by circumferentially-divided eight equal parts of the frame 2. Each pair of the inside attaching seat 6a and the outside attaching seat 6b are located between the adjacent fixed arms 4 and do not interfere with these fixed arms 4. Each pair of the inside attaching seat 6a and the outside attaching seat 6b are in the form of rectangular, and are respectively formed in inner and outer circumferential surfaces of the frame 2 to be opposed to each other, as movable-arm attachment portions. The frame 2 is formed with circular through-holes 7 each of which passes through a pair of the inside attaching seat 6a and the outside attaching seat 6b.

Figure 4A:
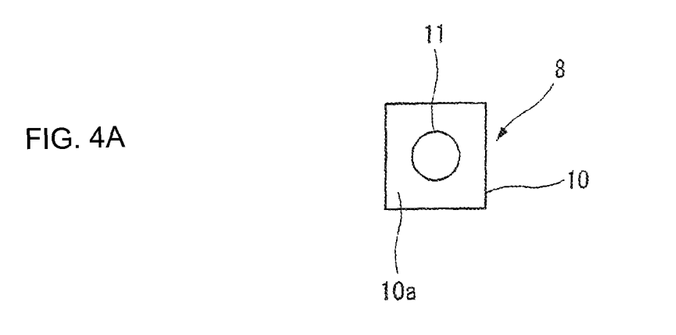
FIG. 4A is a bottom view.
Figure 4B:
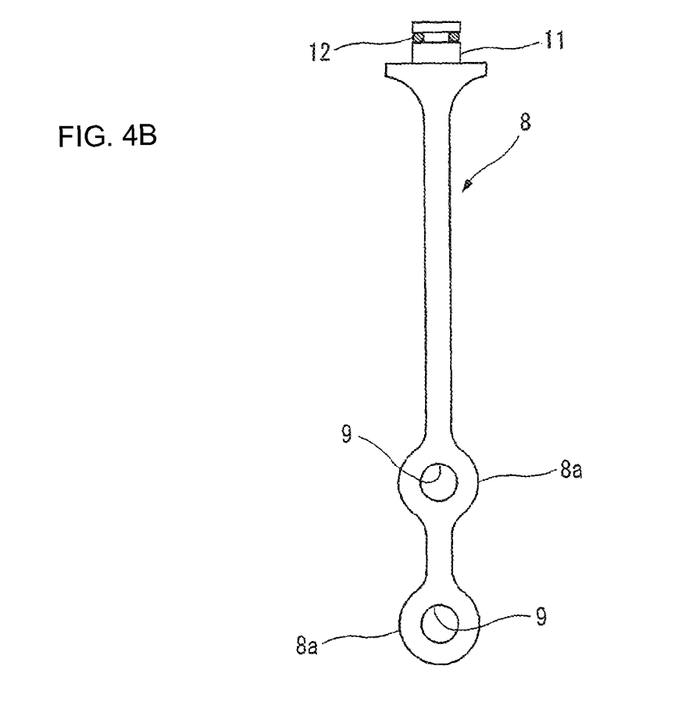
FIG. 4B is a front view.

As mentioned below, when the microphone support device 1 is brought to the accommodated (non-developed) state of FIG. 1 in order to construct the small-size microphone array, each of movable arms 8 shown in FIGS. 4A and 4B is attached to the inside attaching seat 6a in a detachable manner. On the other hand, when the microphone support device 1 is brought to the developed state of FIG. 2 in order to construct the large-size microphone array, each of the movable arms 8 shown in FIGS. 4A and 4B is attached to the outside attaching seat 6b in a detachable manner.

FIGS. 4A and 4B show details of each movable arm 8. The movable arm 8 is made of aluminum alloy in the same manner as the ring-shaped frame 2. An entire length of the movable arm 8 is larger than that of the fixed arm 4. A tip portion of the movable arm 8 is locally thickened to form two cylindrical socket portions 8a which are aligned along an axis of the movable arm 8 itself. Each of the socket portions 8a is formed with a circular attaching hole 9 as a movable-side microphone attachment portion, so that these two attaching holes 9 are aligned with a predetermined pitch (distance). Moreover, a root portion of the movable arm 8 is constituted by a seating flange portion 10 by which the movable arm 8 is attached to the inside attaching seat 6a or the outside attaching seat 6b of the frame 2 mentioned above. The seating flange portion 10 includes a rectangular seat surface 10a and a shaft portion 11. The seat surface 10a can sit on the inside attaching seat 6a and the outside attaching seat 6b. The shaft portion 11 can be inserted into the through-hole 77 (see FIG. 3) of the frame 2. An O-ring 12 is attached into the shaft portion 11.

When the microphone support device 1 is brought to the accommodated (non-developed) state of FIG. 1 in order to construct the small-size microphone array, the seat surface 10a of the seating flange portion 10 of the root portion of each movable arm 8 shown in FIGS. 4A and 4B is seated on the inside attaching seat 6a of the frame 2. At the same time, the shaft portion 11 provided with the O-ring 12 is inserted into the through-hole 7 of the inside attaching seat 6a. Thus, each of the movable arms 8 is held at a predetermined location with compressive deformation force of the O-ring 12.

Figure 8A:
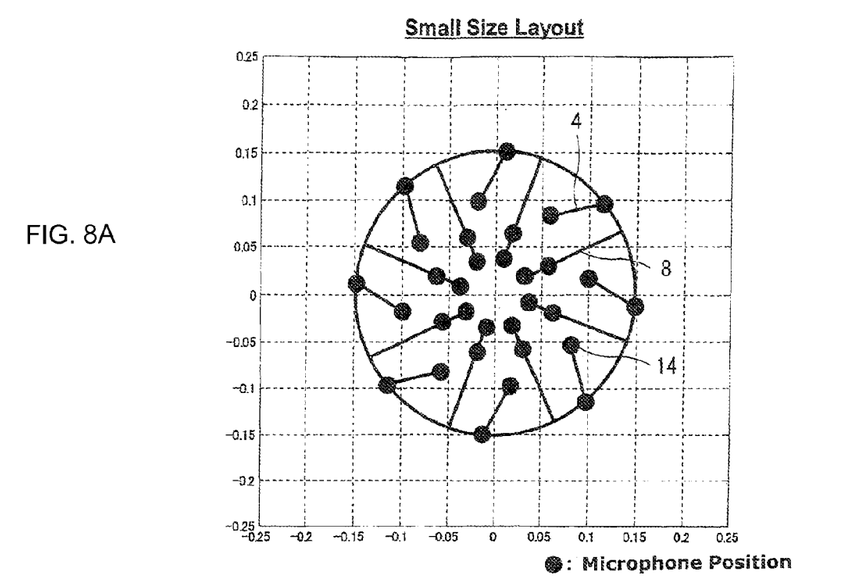
FIG. 8A is an explanatory view showing the small-size microphone array constructed by the accommodated state of the microphone support device shown in FIG. 1.
Figure 8B:
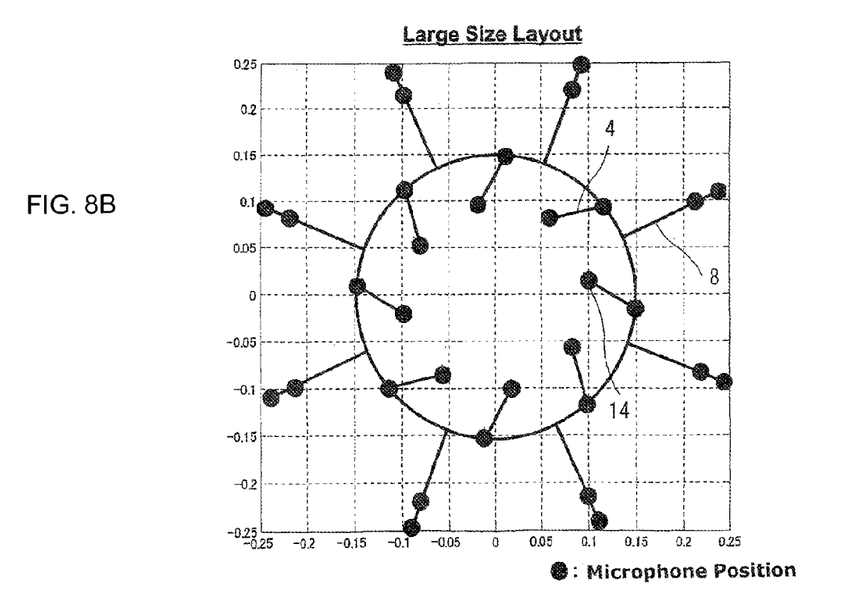
FIG. 8B is an explanatory view showing the large-size microphone array constructed by the developed state of the microphone support device shown in FIG. 2.

On the other hand, when the microphone support device 1 is brought to the developed state of FIG. 2 in order to construct the large-size microphone array, the seat surface 10a of the seating flange portion 10 of the root portion of each movable arm 8 shown in FIGS. 8A and 8B is seated on the outside attaching seat 6b of the frame 2. At the same time, the shaft portion 11 provided with the O-ring 12 is inserted into the through-hole 7 of the outside attaching seat 6b. Thus, each of the movable arms 8 is held at a predetermined location with compressive deformation force of the O-ring 12.

In any of the case that each movable arm 8 is attached to the inside attaching seat 6a of the frame 2 and the case that each movable arm 8 is attached to the outside attaching seat 6b of the frame 2, the axis (or extended axis line) of each movable arm 8 is not precisely oriented to the center C of the frame 2 (see FIG. 3). In other words, each of the inside attaching seats 6a and the outside attaching seats 6b of the frame 2 has a facing direction delicately adjusted in advance such that the axis of each movable arm 8 does not intersect with the center C of the frame 2. It is noted that a special tool or the like is unnecessary for attaching and detaching the movable arm 8 because a force that holds each movable arm 8 to the frame 2 is dependent on the compressive deformation force of the O-ring 12 as mentioned above.

As mentioned above, the circular attaching holes 5 functioning as the stationary-side microphone attachment portions are respectively formed in the tips of the respective fixed arms 4 and the intersection portions between the ring-shaped frame 2 and the fixed arms 4. Similarly, the two circular attaching holes 9 functioning as the movable-side microphone attachment portions are formed in the tip portion of each movable arm 8 such that the two circular attaching holes 9 are aligned with the predetermined pitch.

Figure 5A:
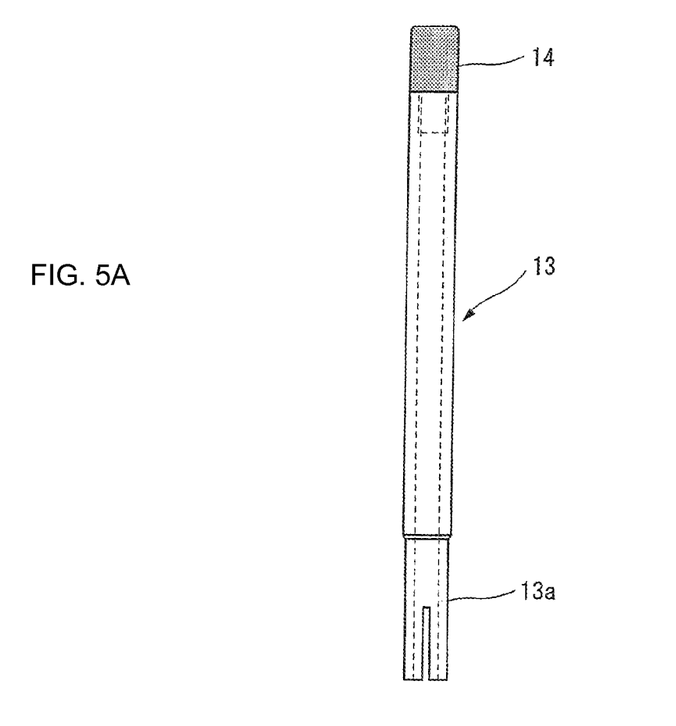
FIG. 5A is a front view.
Figure 5B:
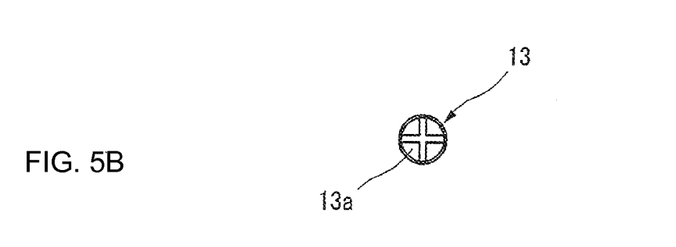
FIG. 5B is a bottom view.
Figure 6:
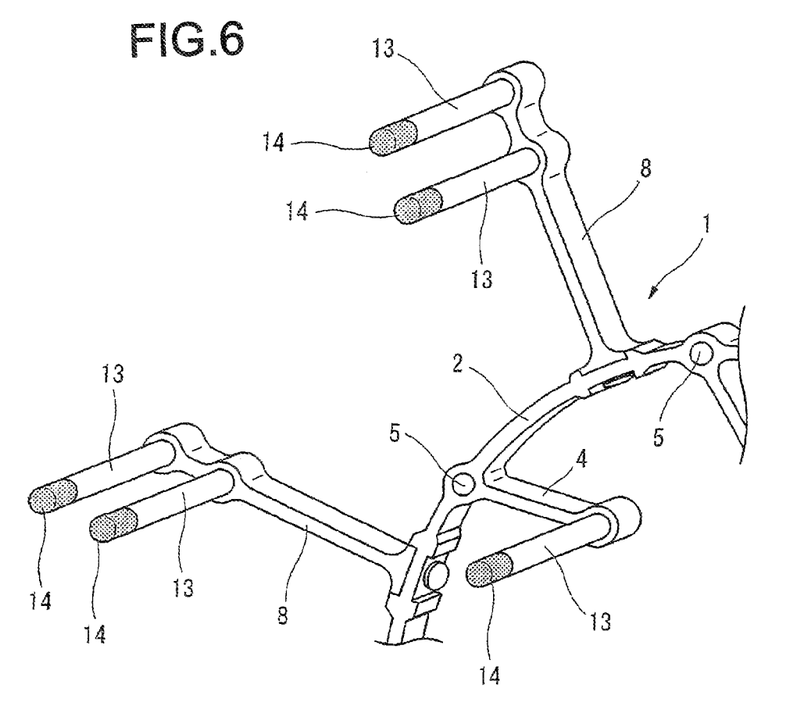
FIG. 6 is an enlarged view of main part which shows a state where microphones have been attached to the microphone support device in the developed state shown in FIG. 2.

Microphones can be attached directly to the attaching holes 5 which function as the stationary-side microphone attachment portions and the attaching holes 9 which function as the movable-side microphone attachment portions. However, in this embodiment, as shown in FIGS. 5A, 5B and 6, rod-shaped microphone holders 13 which are made of resin material and function as extension bars are respectively inserted into and supported by the attaching holes 5 and the attaching holes 9. For example, an insertion base portion 13a of the microphone holder 13 made of polyacetal is inserted into and supported by each of the attaching holes 5 and the attaching holes 9. The predetermined microphone 14 is attached to a tip of each microphone holder 13 coaxially relative to the microphone holder 13. Each microphone holder 13 is designed to make an axis of the microphone holder 13 parallel to an axial center line of the ring-shaped frame 2 under the condition that the microphone holders 13 have been attached to the attaching holes 5 which function as the stationary-side microphone attachment portions and the attaching holes 9 which function as the movable-side microphone attachment portions.

FIG. 6 is an enlarged view of relevant part when the microphone support device 1 has been brought to the developed state of FIG. 2 in order to construct the large-size microphone array. FIG. 6 omits the microphones 14 attached into the attaching holes 5 which function as the stationary-side microphone attachment portions, for purpose of avoiding complexity of the figure.

Figure 7A:
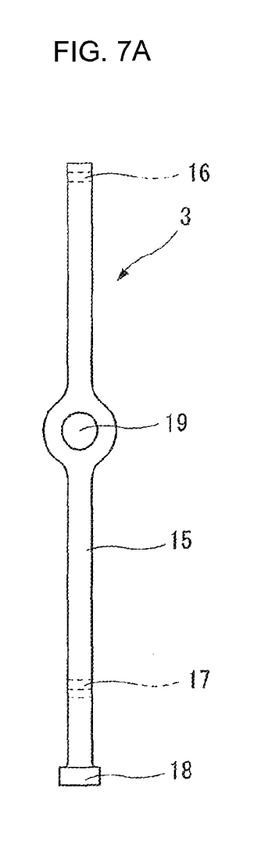
FIG. 7A is a front view.
Figure 7B:
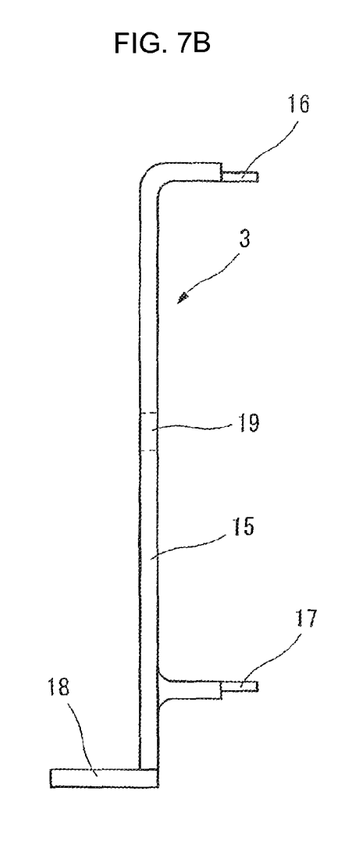
FIG. 7B is a side view.

FIGS. 7A and 7B show details of the stand 3 shown in FIGS. 1 and 2. A stand main body 15 includes a base portion 18. Receiving flange portions 16 and 17 are formed to protrude from upper and lower two spots of the stand main body 15. The stand 3 supports the frame 2 by causing these receiving flange portions 16 and 17 to be in contact with the inner circumferential surface of the ring-shaped frame 2. Moreover, the stand main body 15 is formed with an attaching hole 19 which is located at (a spot overlapping with) the center of the frame 2 supported by the stand main body 15. A camera is attached through a predetermined bracket to the attaching hole 19, as an image pickup means for visualizing a sound source. However, this camera is omitted in the figures.

In the above example, each of the movable arms 8 is detachable relative to the ring-shaped frame 2. However, the structure capable of accommodation and development according to the present invention is not necessarily limited to this. For example, each of the movable arms 8 may be designed to rotate (turn) about a rotation center corresponding to a tangent line of the ring-shaped frame 2. That is, such a rotational operation of each movable arm 8 may construct the structure capable of accommodation and development.

Therefore, when the microphone support device 1 is brought to the accommodated (non-developed) state for purpose of constructing the microphone array having the small size, e.g., a microphone array having 32 microphones and having a diameter approximately equal to 300 mm, the respective movable arms 8 each shown in FIG. 4 are attached to the inside attaching seats 6a of the frame 2. Accordingly, the state shown in FIG. 1 is realized. On the other hand, when the microphone support device 1 is brought to the developed state for purpose of constructing the microphone array having the large size, e.g., a microphone array having 32 microphones and having a diameter approximately equal to 500 mm, the respective movable arms 8 each shown in FIGS. 4A and 4B are attached to the outside attaching seats 6b of the frame 2. Accordingly, the state shown in FIG. 2 is realized.

Then, regardless of whether the microphone support device 1 is in the accommodated state or in the developed state, the microphones 14 are attached respectively through the microphone holders 13 to the attaching holes 5 which function as the stationary-side microphone attachment portions and the attaching holes 9 which function as the movable-side microphone attachment portions, as shown in FIG. 6.

FIG. 8A illustrates the small-size microphone array constructed by the microphone support device 1. FIG. 8B illustrates the large-size microphone array constructed by the microphone support device 1.

The small-size microphone array shown in FIG. 8A corresponds to the accommodated state of FIG. 1. In this state, multiple microphones 14 are attached respectively to the frame 2 itself, the fixed arms 4 and the accommodated movable arms 8. Hence, the multiple microphones 14 are arranged (arrayed) on imaginary four concentric circles which include the ring-shaped frame 2 itself as the largest circle. In this case, the adjustment has been done in advance such that the axes of the respective fixed arms 4 and the respective movable arms 8 are not oriented to the center of the ring-shaped frame 2 as mentioned above. Accordingly, the microphones 14 are not arranged along radial lines which extend from the center of the frame 2 in a radial direction of the frame 2, but are arranged to moderately deviate from these radial lines. Therefore, a reduction in side-lobe level is achieved, so that a localization accuracy can be improved.

On the other hand, the small-size microphone array shown in FIG. 8B corresponds to the developed state of FIG. 2. In this state, multiple microphones 14 are attached respectively to the frame 2 itself, the fixed arms 4 and the developed movable arms 8. Hence, the multiple microphones 14 are arranged (arrayed) on imaginary four concentric circles which include the largest circle given by tips of the respective movable arms 8. In this case, the adjustment has been done in advance such that the axes of the respective fixed arms 4 and the respective movable arms 8 are not oriented to the center of the ring-shaped frame 2 in the same manner as the case of small-size microphone array. The inventor of the present application confirmed that a localization level equivalent to that in the case of small-size microphone array is achieved.

Therefore, in this embodiment, the sound-source localization can be performed with a high accuracy as a whole regardless of the small-size microphone array or the large-size microphone array. In addition, the sound-source localization can be performed over a wider frequency range by selectively switching the size of microphone array.

That is, according to this embodiment, the inventor confirmed that a gain level in side-lobe level is low resulting in a very good result in the case of small-size microphone array. Moreover, in the case of large-size microphone array, the inventor confirmed that a beam having a sharp directivity is obtained especially in a low frequency region.

Moreover, because the microphone holders 13 formed of resin material are used, an insulation between each microphone 14 and the metallic frame 2, the fixed arm 4 or the movable arm 8 is ensured so that the structure having a high immunity to noise can be constructed.

The invention claimed is:

1. A microphone support device for sound source localization, wherein the microphone support device supports a plurality of microphones to form a two-dimensional microphone array for the sound source localization, the microphone support device comprising:
    a ring-shaped frame;
    a plurality of fixed arms formed to protrude from the frame toward an inner side of the frame and not to be oriented to a center of the frame;
    a plurality of movable arms configured to be selectively switched between an accommodated position in which the plurality of movable arms radially protrude from the frame toward the inner side of the frame so as not to be oriented to the center of the frame and not to interfere with the fixed arms and a developed position in which the plurality of movable arms radially protrude from the frame toward an outer side of the frame so as not to orient extended axes of the plurality of movable arms to the center of the frame;
    stationary-side microphone attachment portions formed at tip portions of the fixed arms and intersection portions between the frame and the fixed arms; and
    movable-side microphone attachment portions formed at tip portions of the movable arms.

2. The microphone support device according to claim 1, wherein
    each of the movable arms is detachable relative to the frame for a selective switching between the accommodated position and the developed position.

3. The microphone support device according to claim 2, wherein
    two of the movable-side microphone attachment portions are provided at the tip portion of the movable arm to be aligned along an axis of the movable arm.

4. The microphone support device according to claim 3, wherein
    each of the fixed arms is inclined from a tangent line of the frame in an identical direction with an acute angle.

5. The microphone support device according to claim 4, wherein
    microphone holders are detachably attached to the stationary-side microphone attachment portions and the movable-side microphone attachment portions in parallel with an axial center line of the frame, and
    microphones are attached to tip portions of the microphone holders.

6. The microphone support device according to claim 5, wherein
    each of the frame, the fixed arms and the movable arms is made of metal, and
    each of the microphone holders is made of resin material.

* * * * *